(12) United States Patent
Yang et al.

(10) Patent No.: US 12,455,544 B2
(45) Date of Patent: Oct. 28, 2025

(54) METHOD AND DEVICE FOR TUNING STIFFNESS OF SERVO SYSTEM AND SERVO SYSTEM

(71) Applicant: HARBIN INSTITUTE OF TECHNOLOGY, Harbin (CN)

(72) Inventors: Ming Yang, Harbin (CN); Yangyang Chen, Harbin (CN); Dianguo Xu, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 643 days.

(21) Appl. No.: 17/886,798

(22) Filed: Aug. 12, 2022

(65) Prior Publication Data

US 2023/0059542 A1     Feb. 23, 2023

(30) Foreign Application Priority Data

Aug. 18, 2021   (CN) .......................... 202110957455.2

(51) Int. Cl.
G05B 17/02     (2006.01)
(52) U.S. Cl.
CPC .................................... G05B 17/02 (2013.01)
(58) Field of Classification Search
CPC .. G05B 17/02; G05B 13/024; G05B 19/4142; G05B 2219/34013
See application file for complete search history.

(56) References Cited

U.S. PATENT DOCUMENTS 8,868,250 B2 *  10/2014  Jensen ................... G05B 11/16
                                                              700/40
2016/0360111 A1 * 12/2016  Thivent .................. H04N 23/55

(Continued)

FOREIGN PATENT DOCUMENTS

CN       103986404 A      8/2014
JP       2017041248 A     2/2017

(Continued)

OTHER PUBLICATIONS

Circuit Globe, "Per Unit System", Jan. 27, 2016, https://web.archive.org/web/20160127212819/http://circuitglobe.com:80/what-is-a-per-unit-system.html (Year: 2016).*

(Continued)

*Primary Examiner* — Catherine T. Rastovski
*Assistant Examiner* — Nicholas Zaragoza
(74) *Attorney, Agent, or Firm* — Westbridge IP LLC (57) ABSTRACT

Disclosed is a method for tuning stiffness of a servo system, including: reconstructing a characteristic signal of a servo system; calculating a vibration characteristic covariance coefficient of the servo system according to the characteristic signal; and tuning the stiffness of the servo system according to the calculated vibration characteristic covariance coefficient. By reconstructing the characteristic signal of the servo system, relationships between parameters of the system and the characteristic signal of the system are determined, and then, system stiffness tuning is carried out by calculating the vibration characteristic covariance coefficient of the system. In the process of tuning the stiffness of the servo system, a tuning judgment is made according to the system's own parameters without relying on a special locus, thus increasing the compatibility and intelligence degree of an algorithm.

9 Claims, 3 Drawing Sheets

(56) References Cited

U.S. PATENT DOCUMENTS

2017/0277207 A1\* 9/2017 Peterson ............... F16F 15/002
2017/0300017 A1\* 10/2017 Lijima ................... G05B 5/01

FOREIGN PATENT DOCUMENTS

JP   2017210216 A \* 11/2017
WO  2021048959 A1    3/2021

OTHER PUBLICATIONS

O. Krejcar, R. Frischer and I. Spicka, "Simple Discrete Controller with PWM Power Output," 2010 Fifth International Conference on Systems, Menuires, France, 2010, pp. 181-185, doi: 10.1109/ICONS.2010.38. (Year: 2010).\*
First Office Action issued in counterpart Chinese Patent Application No. 202110957455.2, dated Jun. 24, 2022.

\* cited by examiner

METHOD AND DEVICE FOR TUNING STIFFNESS OF SERVO SYSTEM AND SERVO SYSTEM

CROSS-REFERENCE TO RELATED APPLICATIONS

This application claims priority to Chinese Patent Application No. 202110957455.2, filed on Aug. 18, 2021, the disclosure of which is hereby incorporated by reference in its entirety.

TECHNICAL FIELD

The present application relates to the fields of signal processing technologies and motor system parameter tuning technologies, and in particular, to a method and a device for tuning the stiffness of a servo system and a servo system.

BACKGROUND

In an industrial servo system, there is a wide variety of controlled objects, and default parameters cannot meet the requirements of users on performance, so newly installed servo drives need to be subjected to a series of controller parameter tuning. In order to avoid tedious manual debugging, a servo system parameter auto-tuning technology emerges.

At present, time-domain criteria are used in most of the mainstream drive parameter auto-tuning methods, which often depend on preset special loci, such as a step, sine and a square wave, so as to carry out the tuning of control parameters.

In the process of implementing embodiments of the present disclosure, at least the following problem is discovered in a prior art.

Since a servo system stiffness tuning strategy is determined depending on a special locus, the applicability of an algorithm is decreased.

SUMMARY

In order to have a basic understanding of some aspects of disclosed embodiments, a brief summary is given below. This summary is not a general comment, nor is it intended to determine key/important constituent elements or describe the protection scope of these embodiments, but servers as an introduction to the following detailed description.

Embodiments of the present disclosure provide a method and device for tuning the stiffness of a servo system and a servo system, so as to increase the applicability of a servo system stiffness tuning strategy.

In some embodiments, the method for tuning the stiffness of a servo system includes:
  reconstructing a characteristic signal of a servo system;
  calculating a vibration characteristic covariance coefficient of the servo system according to the characteristic signal; and
  tuning the stiffness of the servo system according to the calculated vibration characteristic covariance coefficient.

In some embodiments, the device for tuning the stiffness of a servo system includes:
  a processor and a memory storing program instructions, the processor being configured to execute the method for tuning the stiffness of a servo system as described above when running the program instructions.

In some embodiments, the servo system includes the device for tuning the stiffness of a servo system as described above.

The method and device for tuning the stiffness of a servo system and the servo system according to the embodiments of the present disclosure can achieve the following technical effects:

By reconstructing the characteristic signal of the servo system, relationships between parameters of the system and the characteristic signal of the system are determined, and then, system stiffness tuning is carried out by calculating the vibration characteristic covariance coefficient of the system. In the process of tuning the stiffness of the servo system, a tuning judgment is made according to the system's own parameters without relying on a special locus, thus increasing the compatibility and intelligence degree of an algorithm, shortening the tuning time and providing better protection for the servo system.

The above general description and the following description are exemplary and explanatory only rather than are intended to limit the present application.

BRIEF DESCRIPTION OF THE DRAWINGS

Exemplary descriptions will be made for one or more embodiments with reference to the corresponding accompanying drawings, but these exemplary descriptions and accompanying drawings do not constitute a limitation to the embodiments. Elements with the same reference numerals in the accompanying drawings are represented as similar elements, and the accompanying drawings do not constitute a scale limitation. Among the accompanying drawings.

DETAILED DESCRIPTION OF THE EMBODIMENTS

In order to have a more detailed understanding of the features and technical contents of the embodiments of the present disclosure, the implementation of the embodiments of the present disclosure will be described in detail below with reference to the accompanying drawings, which are for reference and illustration only rather than are not intended to limit the embodiments of the present disclosure. In the following technical description, for the convenience of explanation, several details are set forth to provide a thorough understanding of the disclosed embodiments. However, one or more embodiments can be implemented even without these details. In other cases, in order to simplify the accompanying drawings, well-known structures and devices can be simply presented.

The terms "first", "second" and the like in the specification and claims of the embodiments of the present disclosure and the above accompanying drawings are used to distinguish similar objects, and are not necessarily used to describe a specific order or sequence. It should be understood that data used in this way can be interchanged under appropriate circumstances, so as to facilitate the description of the embodiments of the present disclosure. In addition, the terms "include" and "have" and any variations thereof are intended to cover non-exclusive inclusion.

Unless otherwise stated, the term "a plurality of" means two or more.

In the embodiments of the present disclosure, the character "/" indicates that the previous and next objects are in an "or" relationship. For example, A/B means: A or B.

The term "and/or" is an association relationship which describes objects, indicating that there may be three relationships. For example, A and/or B mean(s) these three relationships: A, B or A and B.

The term "correspond to" may refer to an association relationship or a binding relationship, and "A corresponds to B" means that there is an association relationship or a binding relationship between A and B.

Figure 1:
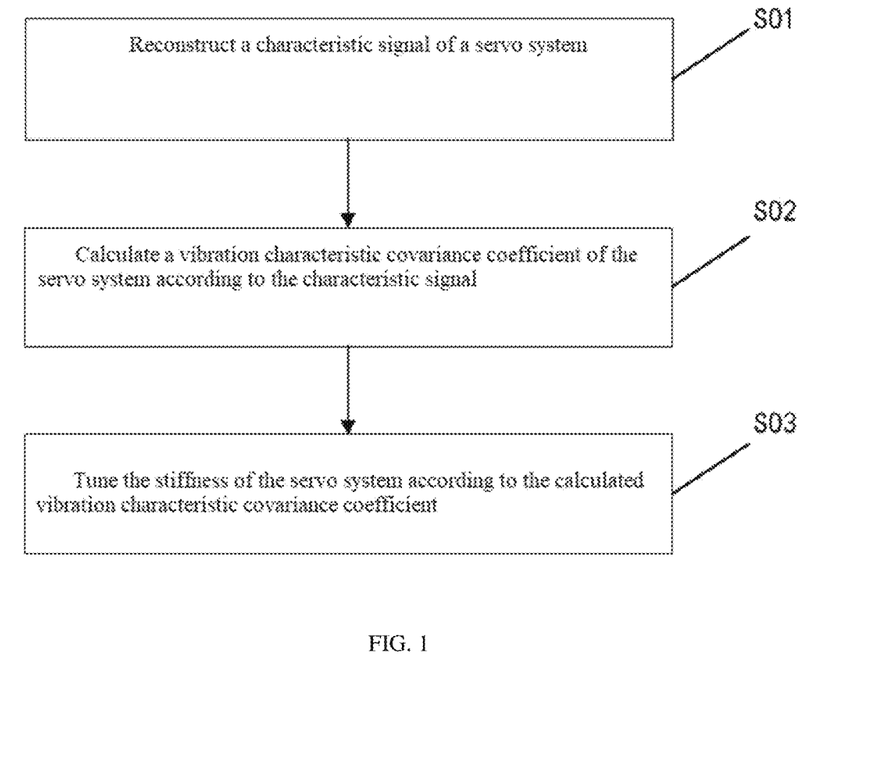
FIG. 1 is a schematic diagram of a method for tuning the stiffness of a servo system according to an embodiment of the present disclosure.

With reference to FIG. 1, an embodiment of the present disclosure provides a method for tuning the stiffness of a servo system, which includes:

S01, reconstructing, by a servo system, a characteristic signal of the servo system;

S02, calculating, by the servo system, a vibration characteristic covariance coefficient of the servo system according to the characteristic signal; and S03, tuning, by the servo system, the stiffness of the servo system according to the obtained vibration characteristic covariance coefficient.

According to the method for tuning the stiffness of a servo system in the embodiment of the present disclosure, by reconstructing the characteristic signal of the servo system, relationships between parameters of the system and the characteristic signal of the system are determined, and then, system stiffness tuning is carried out by calculating the vibration characteristic covariance coefficient of the system. In the process of tuning the stiffness of the servo system, a tuning judgment is made according to the system's own parameters without relying on a special locus, thus increasing the compatibility and intelligence degree of an algorithm, shortening the tuning time and providing better protection for the servo system.

Optionally, the reconstructing a characteristic signal of the servo system includes: acquiring a rotational speed command of a speed loop controller and a rotational speed feedback of the speed loop controller; determining a current command proportional component according to the rotational speed command of the speed loop controller, the rotational speed feedback of the speed loop controller and an equivalent proportional coefficient of the speed loop controller; obtaining a per-unit value of the current command proportional component with a rated current of the system as a reference; and passing the current command proportional component as the per-unit value through a high-pass filter to complete the reconstruction of the characteristic signal of the servo system.

In this technical solution, the speed loop controller is a proportional integral controller. The proportional integral controller may calculate a difference between a rotational speed command $\omega mRef$ of the speed loop controller and a rotational speed feedback om of the speed loop controller collected by the system in the nth cycle to obtain a rotational speed error $\Delta \omega m$ of the speed loop controller in the nth cycle, n being a positive integer.

Optionally, a current command proportional component is determined according to formula (1):

$$Gk=Ksp(\omega mRef-\omega m) \tag{1}$$

where Gk is the current command proportional component, Ksp is a proportional gain coefficient of the speed loop controller, $\omega mRef$ is the rotational speed command of the speed loop controller, and win is the rotational speed feedback of the speed loop controller.

In a practical application, an output transfer function for the speed loop controller may be determined according to formula (2):

$$i_{qRef} = K_{sp}\Delta\omega_m + K_{si}\sum_{i=0}^{i=n}\Delta\omega_m \tag{2}$$

where Ksi is an integral gain coefficient of the speed loop controller, and $i \in n$. It should be understood that the output transfer function for the speed loop controller is composed of a current command proportional component and a current command integral component. In the technical solution of the present application, the current command proportional component Gk is chosen.

In some alternative embodiments, according to an empirical formula, the proportional gain coefficient of the speed loop controller may be determined according to formula (3):

$$Ksp=J\omega sc0/Kt \tag{3}$$

where Kt is an electromagnetic torque constant of a motor, J is an overall rotational inertia of the system, and $\omega sc0$ is a speed loop bandwidth.

It should be understood that the electromagnetic torque constant Kt of the motor and the overall rotational inertia J of the system are magnitudes which can be known according to an actual working condition, and therefore are not specifically defined by the present application.

In some alternative embodiments, according to an empirical formula, the integral gain coefficient of the speed loop controller may be determined according to formula (4):

$$Ksi=\omega sc0/6 \tag{4}$$

where $\omega sc0$ is a speed loop bandwidth.

In a practical application, the speed loop bandwidth $\omega sc0$ may be understood as a stiffness coefficient tuned by the servo system. Then, by bringing formula (3) and formula (4) into formula (2), a relationship between each parameter and the stiffness coefficient $\omega sc0$ in the servo system can be determined. It should be understood that $\omega mRef-\omega m$ in formula (1) has the same meaning as $\Delta \omega m$ in formula (2).

Optionally, the characteristic signal of the servo system may be reconstructed according to formula (5):

$$x_{IIR}(s) = \frac{G_k}{I_N} \cdot G_t \tag{5}$$

where the above formula is an s domain function expression for a reconstructed characteristic signal of the servo system, s being a differential operator in Laplace transform, xIIR being the reconstructed characteristic signal of the servo system, IN being the rated current of the system, and Gt being a function expression for the high-pass filter.

In this technical solution, the servo system includes a speed loop controller and a high-pass filter which are connected in series. The function expression for the high-pass filter may be determined according to formula (6):

$$G_t = \frac{s}{s+2\pi f_{HP}} \tag{6}$$

where fHP is a cutoff frequency of the high-pass filter.

Optionally, the characteristic signal of the servo system may be reconstructed according to formula (7):

$$x_{IIR}(s) = \frac{K_{sp}(\omega_{mRef} - \omega_m)}{I_N} \cdot \frac{s}{s + 2\pi f_{HP}} \quad (7)$$

where the above formula is an s domain function expression for the reconstructed characteristic signal of the servo system.

In a practical application, the cutoff frequency fHP of the high-pass filter may be 30 Hz, 50 Hz, 42 Hz or other values. In the embodiments of the present disclosure, fHP=50 Hz is chosen as the cutoff frequency of the high-pass filter. It should be understood that formula (7) is obtained by bringing formula (1) and formula (6) into formula (5).

Thus, by reconstructing the characteristic signal of the servo system, a control signal may oscillate when the system is unstable, so that oscillation frequency information in the control signal can be captured, and the influence of a direct-current component can be effectively eliminated by the current command proportional component as the per-unit value and the function expression for the high-pass filter, providing a foundation for the system to subsequently tune the stiffness depending on its own parameters.

Optionally, a vibration characteristic covariance coefficient PIIR(n) of the servo system may be calculated according to formula (8):

$$P_{IIR}(n) = (1 - K_{IIR}(n)\Phi(n))P_{IIR}(n-1)/\mu_{IIR} \quad (8)$$

where PIIR(n) is a vibration characteristic covariance coefficient of the servo system in the nth discrete cycle, Φ(n) is a search gradient function for a vibration characteristic frequency of the servo system in the nth discrete cycle, KIIR(n) is a recursive gain of the servo system in the nth discrete cycle, and μIIR is a forgetting factor.

In a practical application, the forgetting factor μIIR serves as a constant to participate in the operation. It should be understood that the initial value of PIIR(n) may be represented by PIIR(0), the value of PIIR(0) may be 0.01, 0.02, 0.04 or other values, and in the embodiments of the present disclosure, PIIR(0)=0.01 is chosen as the initial value of PIIR(n).

KIIR (n) and Φ(n) are determined according to the characteristic signal.

Optionally, the determination of KIIR(n) and Φ(n) according to the characteristic signal includes:
establishing an expected transfer function of vibration yIIR(n) according to the characteristic signal;
establishing a search gradient function Φ(n) for the vibration characteristic frequency according to yIIR(n); and
updating a recursive gain KIIR(n) according to Φ(n).

Optionally, the expected transfer function of vibration yIIR(n) is determined according to formula (9):

$$y_{IIR}(n) = \frac{1 + a_{IIR}(n-1)z^{-1} + z^{-2}}{1 + a_{IIR}(n-1)\rho z^{-1} + \rho^2 z^{-2}} x_{IIR}(n) \quad (9)$$

where the above formula is a z domain transfer function expression for the expected transfer function of vibration, z being a transform operator in discrete domain Z transform, n representing the nth discrete cycle, n being an integer greater than or equal to 1, aIIR(n) being a matching frequency parameter for the expected transfer function of vibration, and ρ being a transmitting vibration suppression width constant.

In a practical application, the initial value of aIIR(n) may be represented by aIIR(0), the value of aIIR(0) may be 0, 1, 0.35 or other values, and the transmitting vibration suppression width constant ρ may be 0.7, 0.8, 0.9 or other values. In the embodiments of the present disclosure, aIIR(0)=0 is chosen as the initial value of aIIR(n), and ρ=0.9 is chosen as the transmitting vibration suppression width constant.

Optionally, the search gradient function Φ(n) for the vibration characteristic frequency is established according to formula (10):

$$\phi(n) = \frac{\partial y_{IIR}(n)}{\partial a_{IIR}(n-1)} = \frac{(x_{IIR}(n) - \rho y_{IIR}(n))z^{-1}}{1 + a_{IIR}(n-1)\rho z^{-1} + \rho^2 z^{-2}} \quad (10)$$

where Φ is a search gradient value of the vibration characteristic frequency, and ∂ is a partial differential operator.

Optionally, the recursive gain KIIR(n) is updated according to formula (11):

$$K_{IIR}(n) = \frac{P_{IIR}(n-1)\phi(n)}{\mu_{IIR} + \phi(n)P_{IIR}(n-1)\phi(n)} \quad (11)$$

where PIIR(n) is updated according to the matching frequency parameter for the expected transfer function of vibration.

Optionally, the matching frequency parameter for the expected transfer function of vibration is updated according to formula (12):

$$a_{IIR}(n) = a_{IIR}(n-1) - K_{IIR}(n)y_{IIR}(n) \quad (12)$$

where aIIR(n) is a matching frequency parameter for the expected transfer function of vibration.

In the embodiments of the present disclosure, it should be understood that the establishing an expected transfer function of vibration yIIR(n), establishing a search gradient function Φ(n) for the vibration characteristic frequency, updating a recursive gain KIIR(n), calculating a vibration characteristic covariance coefficient PIIR(n) of the servo system and updating the matching frequency parameter aIIR(n) for the expected transfer function of vibration may be understood as five steps in a discrete cycle. In a practical application, in the expected transfer function of vibration yIIR(n), i.e., corresponding to formula (9), it should be understood that in the first discrete cycle, the matching frequency parameter aIIR(n) for the expected transfer function of vibration takes the initial value aIIR(0) to participate in calculation. Further, according to the expected transfer function of vibration yIIR(n) in the nth discrete cycle, a search gradient function Φ(n) for the vibration characteristic frequency is determined, i.e., corresponding to formula (10). Further, according to the search gradient function Φ(n) for the vibration characteristic frequency in the nth discrete cycle, the vibration characteristic covariance coefficient PIIR(n) of the servo system in the nth discrete cycle and the forgetting factor μIIR, the recursive gain KIIR(n) is updated, i.e., corresponding to formula (11). It should be understood that in the first discrete cycle, the vibration characteristic covariance coefficient PIIR(n) takes an initial value PIIR(0) to participate in the calculation, and at this point, the vibration characteristic covariance coefficient PIIR(n) of the servo system in the nth discrete cycle can be solved, i.e., corresponding to formula (8). Further, according to a recursive gain KIIR(n) in the nth discrete cycle and the expected transfer function of vibration yIIR(n) in the nth discrete cycle, the matching frequency parameter aIIR(n) for the expected transfer function of vibration is updated, i.e., corresponding to formula (12). The obtained updated matching frequency parameter aIIR(n) for the expected transfer function of vibration is brought into the expected transfer function of vibration yIIR(n+1), so that the servo system can carry out the next discrete cycle.

Thus, by establishing the expected transfer function of vibration, establishing the search gradient function for the vibration characteristic frequency, updating the recursive gain and updating the matching frequency parameter for the expected transfer function of vibration, vibration characteristic covariance coefficients of the servo system in different discrete cycles are determined, thereby providing a judgment basis for the system to subsequently tune the stiffness depending on its own parameters.

Optionally, the tuning the stiffness of the servo system according to the calculated vibration characteristic covariance coefficient includes: judging the stability of the servo system; if the servo system is unstable, reducing the stiffness of the servo system at the end of a cycle, and ending the system tuning process; or if the servo system is stable, increasing the stiffness of the system at the end of the cycle.

In a practical application, "at the end of a cycle" refers to "after the end of the nth discrete cycle". That is, if the servo system is unstable, the stiffness of the servo system is reduced at the end of the nth discrete cycle, and the system tuning process is ended; or if the servo system is stable, the stiffness of the system is increased at the end of the nth discrete cycle.

Optionally, the judging the stability of the servo system includes:

judging whether the duration for which the calculated vibration characteristic covariance coefficient PIIR(n) is less than a preset coefficient threshold qIIR1 reaches a set duration qIIR2; if so, the servo system being considered unstable; otherwise, the servo system being considered stable.

Optionally, the stability of the servo system may be judged according to the following formula:

$$P_{IIR}(n)|_{n \in [kT_s(k+q_{IIR2})T_s]} \leq q_{IIR1}$$

If the above inequality is met, it is judged that the system state is unstable; where k is a positive integer, qIIR1 is the preset threshold of the vibration characteristic covariance coefficient of the servo system, qIIR2 is the preset duration threshold of the vibration characteristic covariance coefficient of the servo system, and Ts is a discrete cycle.

Thus, according to the method for tuning the stiffness of a servo system in the embodiment of the present disclosure, by reconstructing the characteristic signal of the servo system, the relationships between the parameters of the system and the characteristic signal of the system are determined, and then, system stiffness tuning is carried out by calculating the vibration characteristic covariance coefficient of the system. In the process of tuning the stiffness of the servo system, the tuning judgment is made according to the system's own parameters without relying on the special locus, thus increasing the compatibility and intelligence degree of the algorithm, shortening the tuning time and providing better protection for the servo system.

Figure 2:
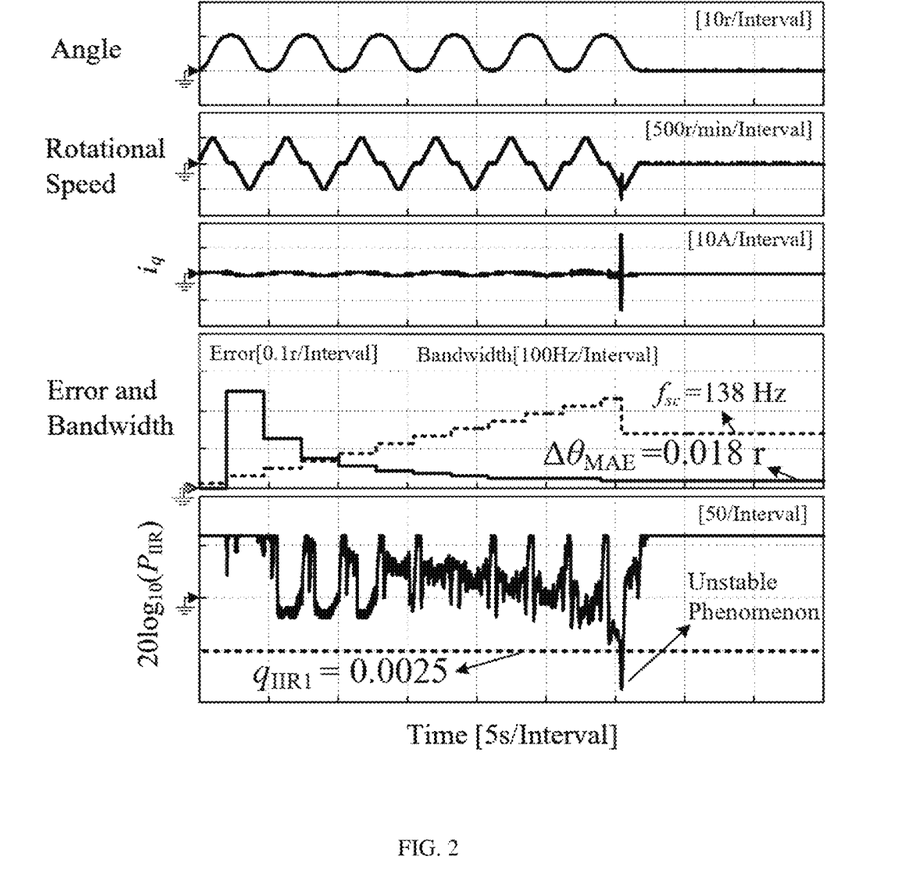
FIG. 2 is an experimental data graph according to an embodiment of the present disclosure.

With reference to FIG. 2, an experimental data graph in the embodiment of the present disclosure shows that fHP is set at 50 Hz, ρ is a constant of 0.9, PIIR(0) is 0.01, aIIR(0) is 0, qIIR1 is 0.0025, and qIIR2 is 0.1. In the drawing, the system is in a position control mode, iq is the q-axis current of the system for reflecting a current torque value, the tuning trajectory is a reciprocating condition with a maximum stroke of 10r and a maximum rotational speed of positive and negative 500 r/min, fsc represents a system bandwidth, i.e., system stiffness, and ΔθMAE represents a calculated mean absolute error result of following errors of the system in a single subcycle. It can be seen that with the increase of the system stiffness fsc, the following error ΔθMAE is gradually decreased, and the value of the covariance coefficient PIIR of the servo system is gradually decreased as well by reconstructing the characteristic signal of the servo system, but do not meet the unstable condition of the system, so the stiffness of the system is gradually increased under the action of the stiffness tuning strategy. Around the 30 s, the stiffness of the system is gradually increased to a limit, and the system becomes unstable. That is, the q-axis current and rotational speed are fluctuated greatly, and at this point, it is dropped sharply below 0.0025, and is kept for more than 0.01 s. Thus, the condition of judging an unstable frequency domain of the system based on the covariance coefficient is met, judging that the system is unstable. Then, the stiffness of the system is immediately reduced to 138 Hz under the action of the stiffness tuning strategy. Consequently, the system becomes stable again, and the tuning of the stiffness of the servo system is completed as well, achieving a more suitable stiffness of the servo system.

Figure 3:
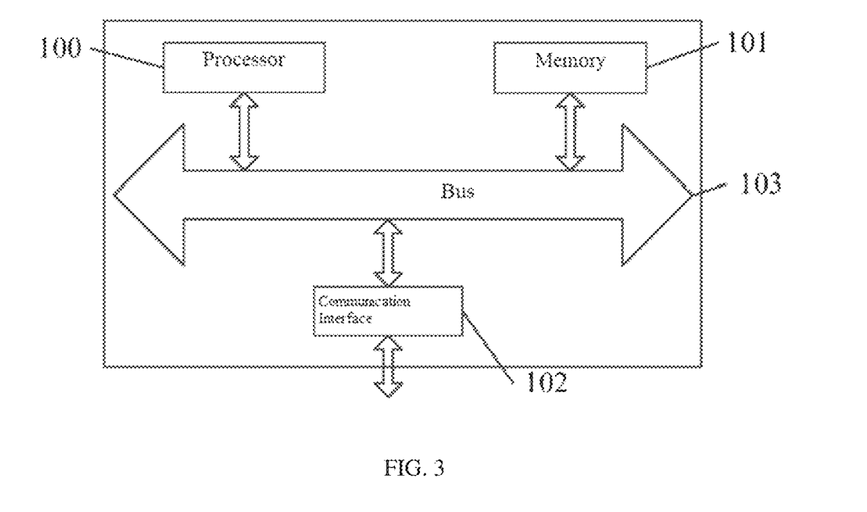
FIG. 3 is a schematic diagram of a device for tuning the stiffness of a servo system according to an embodiment of the present disclosure.

With reference to FIG. 3, an embodiment of the present disclosure provides a device for tuning the stiffness of a servo system, including a processor 100 and a memory 101. Optionally, the device may further include a communication interface 102 and a bus 103. The processor 100, the communication interface 102 and the memory 101 can communicate with one another through the bus 103. The communication interface 102 may be configured to transmit information. The processor 100 may call logic instructions in the memory 101 to execute the method for tuning the stiffness of a servo system according to the above embodiment.

In addition, the aforementioned logic instructions in the memory 101 may be implemented in the form of a software functional unit, and may be stored in a computer-readable storage medium when sold or used as an independent product.

As a computer-readable storage medium, the memory 101 may be configured to store a software program or a computer-executable program, such as program instructions/modules corresponding to the method in the embodiment of the present disclosure. The processor 100 executes functional applications and data processing by running the program instructions/modules stored in the memory 101, i.e., implementing the method for tuning the stiffness of a servo system in the aforementioned embodiment.

The memory 101 may include a program storage area and a data storage area. The program storage area may store an operating system and an application required by at least one function. The data storage area may store data created according to the use of a terminal device, or the like. In addition, the memory 101 may include a high-speed random access memory as well as a non-volatile memory.

An embodiment of the present disclosure provides a servo system, including the device for tuning the stiffness of a servo system.

The technical solution of the embodiments of the present disclosure may be embodied in the form of a software product, which is stored in a storage medium and includes one or more instructions for making a computer device (e.g. a personal computer, a server or a network device) execute all or part of the steps of the method according to the embodiment of the present disclosure. The aforementioned storage medium may be a non-transient storage medium, including a USB flash disk, a mobile hard disk, a read-only memory (ROM), a random access memory (RAM), a magnetic disk or an optical disk and other media which can store program codes, and may also be a transient storage medium.

The above description and the accompanying drawings fully illustrate the embodiments of the present disclosure to enable those skilled in the art to practice them. Other embodiments may include structural, logical, electrical, procedural and other variations. The embodiments only represent possible variations. Unless explicitly required, individual components and functions are optional, and the sequence of operations may be changed. Parts and features of some embodiments may be included in or substituted for parts and features of other embodiments. Moreover, the words used in the present application are only used to describe the embodiments rather than to limit the claims. As used in the description of the embodiments and the claims, unless clearly indicated in the context, the singular forms of "a", "an" and "the" are intended to also include plural forms. Similarly, the term "and/or" as used in the present application refers to any and all possible combinations including one or more associated listings. In addition, when used in the present application, the term "comprise" and its variants, such as "comprises" and/or "comprising", refer to the presence of stated features, integers, steps, operations, elements and/or components, but do not exclude the presence or addition of one or more other features, integers, steps, operations, elements, components and/or groups of these. Without more restrictions, the elements defined by the sentence "include a . . . " do not exclude the presence of other identical elements in the process, method or device including the elements. Here, the differences of each embodiment from the other embodiments may be mainly described, and the same or similar parts of the embodiments may refer to one another. For the method, product and so on disclosed in the embodiments, if it corresponds to the method part disclosed in the embodiment, please refer to the description of the method part.

Those skilled in the art can realize that the units and algorithm steps of each example described in conjunction with the embodiments disclosed herein can be implemented by electronic hardware or a combination of computer software and electronic hardware. Whether these functions are implemented by hardware or software may depend on specific applications and design constraints of the technical solution. Those skilled in the art can use different methods for each specific application to implement the described functions, but this implementation should not be considered beyond the scope of the embodiments of the present disclosure. It can be clearly understood by those skilled in the art that for convenience and simplicity of description, the specific operating process of the system, the device and the units described above may refer to the corresponding processes in the foregoing method embodiments, which will not be repeated here.

In the embodiments disclosed herein, the disclosed method and product (including but not limited to the device, equipment, etc.) may be implemented in other ways. For example, the above-described apparatus embodiments are merely illustrative, and for example, the division of the units may be only one type of logical function division. Other division methods may be implemented in practice, for example, multiple units or components may be combined or integrated into another system, or some features may be omitted, or not executed. In addition, mutual coupling or direct coupling or communication connection shown or discussed may be indirect coupling or communication connection through some interfaces, apparatuses or units, or may be in electrical, mechanical or other forms. The units described as separate parts may or may not be physically separated, and parts displayed as units may or may not be physical units, that is, they may be located at one position or distributed on multiple network units. Some or all of the units can be selected according to actual needs to achieve the embodiments. In addition, functional units in the embodiments of the present disclosure may be integrated into one processing unit, or each unit may exist alone physically, or two or more units may be integrated into one unit.

The flowcharts and block diagrams in the accompanying drawings show possible implementations of architectures, functions and operations of the systems, the methods and the computer program products according to the embodiments of the present disclosure. In this regard, each block in the flowchart or block diagram may represent a module, a program segment or part of codes, and the module, the program segment or part of the codes contains one or more executable instructions for implementing the specified logical functions. In some alternative implementations, the functions marked in the blocks may also occur in a different order than those marked in the accompanying drawing. For example, actually, two consecutive blocks may be executed substantially in parallel, and they may sometimes be executed in a reverse order, depending on the functions involved. In the descriptions corresponding to the flowchart and the block diagram in the accompanying drawings, the operations or steps corresponding to the different blocks may also occur in an order different from that disclosed in the descriptions, and sometimes there is no specific order between the different operations or steps. For example, actually, two consecutive operations or steps may be executed substantially in parallel, and they may sometimes be executed in a reverse order, depending on the functions involved. Each block in the block diagram and/or flowchart and a combination of the blocks in the block diagram and/or flowchart may be implemented by using a dedicated hardware-based system that performs the specified functions or actions, or may be implemented by using a combination of dedicated hardware and computer instructions.

What is claimed is:

1. A method for tuning stiffness of a servo system, comprising:
reconstructing a characteristic signal of a servo system;
calculating a vibration characteristic covariance coefficient of the servo system according to the characteristic signal; and
tuning the stiffness of the servo system according to the calculated vibration characteristic covariance coefficient;
wherein the vibration characteristic covariance coefficient $P_{IIR}(n)$ of the servo system is calculated according to the following formula:

$$P_{IIR}(n)=(1-K_{IIR}(n)\Phi(n))P_{IIR}(n-1)/\mu_{IIR}$$

wherein $P_{IIR}(n)$ is a vibration characteristic covariance coefficient of the servo system in the nth discrete cycle, $\Phi(n)$ is a search gradient function for a vibration characteristic frequency of the servo system in the nth discrete cycle, $K_{IIR}(n)$ is a recursive gain of the servo system in the nth discrete cycle, n represents the nth discrete cycle, n is an integer greater than or equal to 1, and $\mu_{IIR}$ is a forgetting factor, and wherein $K_{IIR}(n)$ and $\Phi(n)$ are determined according to the characteristic signal.

2. The method of claim 1, wherein the servo system comprises a speed loop controller and a high-pass filter which are connected in series; and the step of reconstructing a characteristic signal of a servo system comprises:

acquiring a rotational speed command of the speed loop controller and a rotational speed feedback of the speed loop controller, determining a current command proportional component according to the rotational speed command of the speed loop controller, the rotational speed feedback of the speed loop controller and an equivalent proportional coefficient of the speed loop controller, obtaining a per-unit value of the current command proportional component with a rated current of the system as a reference; and passing the current command proportional component as the per-unit value through the high-pass filter to complete the reconstruction of the characteristic signal of the servo system.

3. The method of claim 2, wherein the current command proportional component is determined according to the following formula:

$$G_k = K_{sp}(\omega_{mRef} - \omega_m)$$

wherein $G_k$ is the current command proportional component, $K_{sp}$ is a proportional gain coefficient of the speed loop controller, $\omega_{mRef}$ is the rotational speed command of the speed loop controller, and $\omega_m$ is the rotational speed feedback of the speed loop controller.

4. The method of claim 3, wherein the reconstruction of the characteristic signal of the servo system is carried out according to the following formula:

$$x_{IIR}(s) = \frac{G_k}{I_N} \cdot G_t$$

wherein the above formula is an s domain function expression for a reconstructed characteristic signal of the servo system, s is a differential operator in Laplace transform, $x_{IIR}$ is the reconstructed characteristic signal of the servo system, $I_N$ is the rated current of the system, and $G_t$ is a function expression for the high-pass filter.

5. The method of claim 1, wherein the determining $K_{IIR}(n)$ and $\Phi(n)$ according to the characteristic signal comprises:

establishing an expected transfer function of vibration $y_{IIR}(n)$ according to the characteristic signal;

establishing a search gradient function $\Phi(n)$ for the vibration characteristic frequency according to the expected transfer function of vibration $y_{IIR}(n)$; and updating a recursive gain $K_{IIR}(n)$ according to the search gradient function $\Phi(n)$.

6. The method of claim 1, wherein the step of tuning the stiffness of the servo system according to the calculated vibration characteristic covariance coefficient comprises:

judging the stability of the servo system;

if the servo system is unstable, reducing the stiffness of the servo system at the end of a cycle, and ending the system tuning process; or if the servo system is stable, increasing the stiffness of the system at the end of the cycle.

7. The method of claim 6, wherein the step of judging the stability of the servo system comprises:

judging whether the duration for which the calculated vibration characteristic covariance coefficient $P_{IIR}(n)$ is less than a preset coefficient threshold $q_{IIR1}$ reaches a set duration $q_{IIR2}$; if so, the servo system being considered unstable; otherwise, the servo system being considered stable.

8. A device for tuning stiffness of a servo system, comprising a processor and a memory storing program instructions, wherein the processor is configured to execute the method for tuning stiffness of a servo system of claim 1 when running the program instructions.

9. A servo system, comprising a speed loop controller and a high-pass filter which are connected in series, wherein the servo system further comprises the device for tuning stiffness of a servo system of claim 8.

* * * * *